United States Patent [19]

Tenace et al.

[11] Patent Number: 5,510,576
[45] Date of Patent: Apr. 23, 1996

[54] TELECOMMUNICATIONS CABLE ENCLOSURE

[75] Inventors: Michael Tenace; George Debortoli, both of Ottawa, Canada

[73] Assignee: Northern Telecom Limited, Montreal, Canada

[21] Appl. No.: 158,539

[22] Filed: Nov. 29, 1993

[51] Int. Cl.⁶ .................................................. H02G 3/18
[52] U.S. Cl. ........................................ 174/65 SS; 248/56
[58] Field of Search ............................ 174/65 R, 65 SS; 248/56

[56]  References Cited

U.S. PATENT DOCUMENTS 2,076,261  4/1937  Bauroth ............................. 174/65 SS
4,963,698  10/1990  Chang et al. ......................... 174/77 R

FOREIGN PATENT DOCUMENTS 2007041  5/1979  United Kingdom ............... 174/65 SS Primary Examiner—Kristine L. Kincaid
Assistant Examiner—Michael J. Cornelison
Attorney, Agent, or Firm—R. J. Austin

[57] ABSTRACT

Transmission cable enclosure with a resiliently flexible cable sealing member within an inlet passage of a housing of the enclosure. The sealing member surrounds the cable when installed and a device is provided to apply a constant compressive force axially upon the sealing member. This constant force resiliently deforms the sealing member inwards to continuously seal against the cable irrespective of ambient temperature and pressure conditions. Also provided is a device for gripping the cable close to the sealing member to prevent axial movement of the cable at this location. The arrangement is suitable for passage of a single length or two closely positioned lengths of cable passing through the inlet passage.

5 Claims, 5 Drawing Sheets

TELECOMMUNICATIONS CABLE ENCLOSURE

This invention relates to telecommunications cable enclosures.

Enclosures are known for use with telecommunications cables. Such enclosures are normally used for the purpose of providing environmental protection to exposed signal transmission conductors and terminals or splices into which these conductors extend to join them in series from one cable to another. Enclosures are also used to protect connections between conductors of cables located underground and for this purpose such enclosures need to be located within manholes to which the cables extend.

Particular problems exist with the use of enclosures in manholes in avoiding ingress of moisture into chambers of the enclosures and subsequent damage to exposed conductors and/or connections. The cables extend through apertures in walls of the enclosures and positive steps need to be taken to prevent leakage through the apertures and around the cables. Initially, in early designs of enclosure, the cables were made with lead sheaths and seals were provided by soldering lead between surfaces of cables and enclosure surfaces surrounding the apertures. Such methods of sealing were it is believed, used from about 1920 onwards. The seals were difficult to fabricate due to the cramped and confined spaces within manholes and, as each cable needed to be sealed individually after conductor termination or splices were made, an installer's time spent within a manhole tended to be extremely lengthy. In later years, environmental studies showed that there was potential deterioration in health of underground cable installers because of the toxicity levels reached in the confined manhole spaces when soldering lead. As a result, and after many years of use of lead seals, this sealing practice was terminated, it is believed, sometime during the 1960s.

The soldered lead seal was then replaced by a method which was particularly arduous and laborious within the confines of a manhole. This method consisted basically in providing windings of sealing tape around cable in the regions adjacent to the apertures through which the cables passed, and then applying sealing clamps around the tape. This method, which is still being followed at present, is particularly time consuming when, for instance, a large number of cables are passed into an enclosure. Sealing efficiency is also suspect because it is sensitive to the skill of the craftsman in the manner of laying a large number of tape windings around the cable and the relationship and overlap of these windings.

Another problem which may exist is that of preventing freedom of axial movement of cables passing through seals of enclosures. As will be realized, even though sealing of a cable in an enclosure may be expertly and efficiently practised, should the cable move axially even in the slightest degree after installation of the seal, there is the distinct possibility that such movement has the effect of placing undue strain on the seal which could break the efficiency of the seal either against the cable or against a surface of the enclosure. It was found in the case of the original solder leaded cable seals, that the part of the cable entering the enclosure was restrained from movement by the lead. However, when lead was replaced by other types of seals, it could not be guaranteed that the cables would remain in the positions in which they had been sealed. Various types of clamping methods have been tried with these other seals, but without great success.

The present invention seeks to provide a transmission cable enclosure which has a novel method of sealing against a cable and which also provides for efficient clamping to prevent axial movement of the sealed part of the cable.

Accordingly, the present invention provides a transmission cable enclosure comprising:—a housing in a wall of the enclosure, the housing formed with an inlet passage for insertion of a cable through the wall of the enclosure; a resiliently flexible sealing member for location within the inlet passage of the housing in a position for surrounding the cable; means for applying a constant compressive force in an axial direction of the inlet passage upon the sealing member to cause the sealing member to be resiliently deformed radially inwards of the inlet passage and into sealing contact with the cable; and means for gripping a part of the cable in a position axially spaced from the sealing member to hold the gripped part of the cable immovable relative to the housing.

Thus, according to the present invention, the sealing member seals against the cable because of its radially inwards resilient deformation. Because a constant compressive force is applied against the sealing member, this overcomes any problems concerned with change in environmental conditions or of loss of hysteresis of the sealing member. Thus the radially inward deformation of the sealing member into contact with the cable is maintained and continuously pressurizes the outside surface of the cable. The constant compressive force applying means ensures a constant sealing action and the gripping means ensures that the cable is immovable within the sealing member so that the sealing member is not strained in such a manner as to break the seal. According to a preferred arrangement, the means for gripping the cable comprises a clamping device which is secured to the housing. For this purpose the clamping device may be located in an operating position axially beyond one end of the inlet passage and the securing means operates to hold the clamming device in its operating position. In a practical construction the clamping device has at least two gripping members which are relatively disposable in operative positions to grip the cable between them when located through the sealing member in the inlet passage. Holding means is also provided in this practical arrangement to hold the gripping members in the operative positions, i.e., the gripping members are secured together, and means is also provided to secure the gripping members to the housing itself at the one, end of the inlet passage. Thus the gripping members become immovable relative to the housing and effectively become a part of the housing itself. Thus with this arrangement, the sealing member is entrapped within the inlet passage to seal around the cable and is held in that position by the compressive force applying means while the gripping members are also immovable relative to the housing and thus to the inlet passage so as to hold the part of the cable which is sealed immovably within the inlet passage.

In certain structures, it is found to be convenient to pass two lengths of cable through a single inlet passage in a housing of an enclosure. This is particularly the case where the two lengths of cable are provided by a single cable of indefinite length which is passed through the inlet passage into the enclosure and is bent within the enclosure so as to double back through the inlet passage. As may be seen, problems may exist with locating a seal axially onto the indefinite length of cable because no close end of cable exists within the enclosure for such an act to be performed. In addition, sealing problems increase when two cable lengths are to be sealed within the same inlet passage.

The present invention also provides a transmission cable enclosure which minimizes the latter problems.

Accordingly, and according to a further feature of the invention, a transmission cable enclosure comprises:— a housing in a wall of the enclosure, the housing formed with an inlet passage for insertion of two laterally spaced apart lengths of cable through the wall of the enclosure; a resiliently flexible sealing member for location within the inlet passage of the housing and formed with two spaced bores for sealing around the two lengths of cable, the flexible sealing member also formed with a slit extending radially from each bore to an outer peripheral surface of the sealing member for lateral movement along the slit and into the bore of one of the lengths of cable, each slit extending from its associated bore at an acute angle to the outer peripheral surface of the sealing member in the region of emergence of the slit at the outer peripheral surface whereby upon application of a radially compressive load placed upon the outer peripheral surface, the sides of each slit are compressed together to sealingly close the slit; and means for applying a constant compressive force in an axial direction of the inlet passage upon the sealing member to cause the sealing member to be resiliently deformed radially inwardly of the inlet passage and into sealing contact with the cable lengths and also to sealingly close the slits.

Thus with the use of the flexible sealing member according to the further aspect of the invention, the two laterally spaced apart lengths of cable may be inserted laterally through the slits into the bores for sealing purposes within the bores, the slits being disposed in such a position that upon the sealing member being forced inwardly under compression to seal against the board, the two sides of each slit are also forced together so as to sealingly enclose the slit.

In a preferred arrangement, the sealing member is formed with two planar sides which provide parts of its outer peripheral surface with the slits extending at acute angles to and emerging at the outer peripheral surface, one slit to each planar side. With this arrangement, a compressive force placed upon each planar side effectively closes the slits because one side of each slit is effectively forced into compressive engagement with the other side.

Embodiments of the invention will now be described by way of example, with reference to the accompanying drawings, in which.

Figure 1:
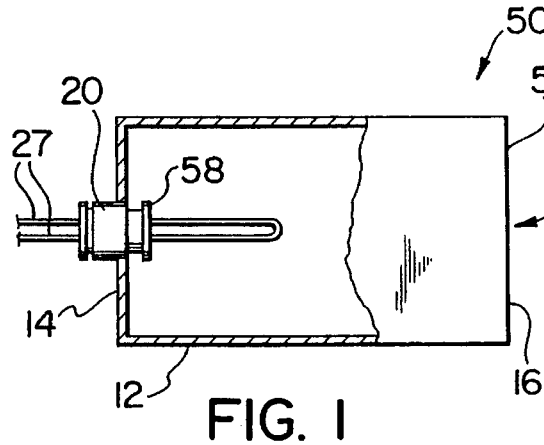
FIG. 1 is a side elevational view, slightly in cross-section, of an enclosure according to a first embodiment.

In a first embodiment as shown in FIG. 1, a transmission cable enclosure 10 for enclosing telecommunication cable splices or terminals comprises a cylindrical chamber 12 having two end walls 14 and 16. It is intended that a telecommunications cable 29 which may be either an optical cable or an electrical cable, should pass through the end wall 14 into the interior of the enclosure 10 for the purpose of being spliced or otherwise connected to a further cable (not shown).

Figure 3:
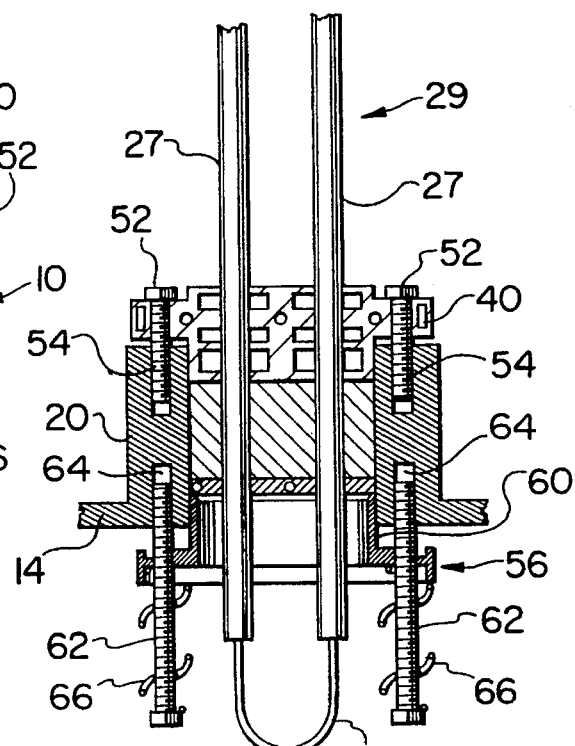
FIG. 3 is a cross-sectional view of the parts of the first embodiment taken along Line III—III in FIG. 2.
Figure 2:
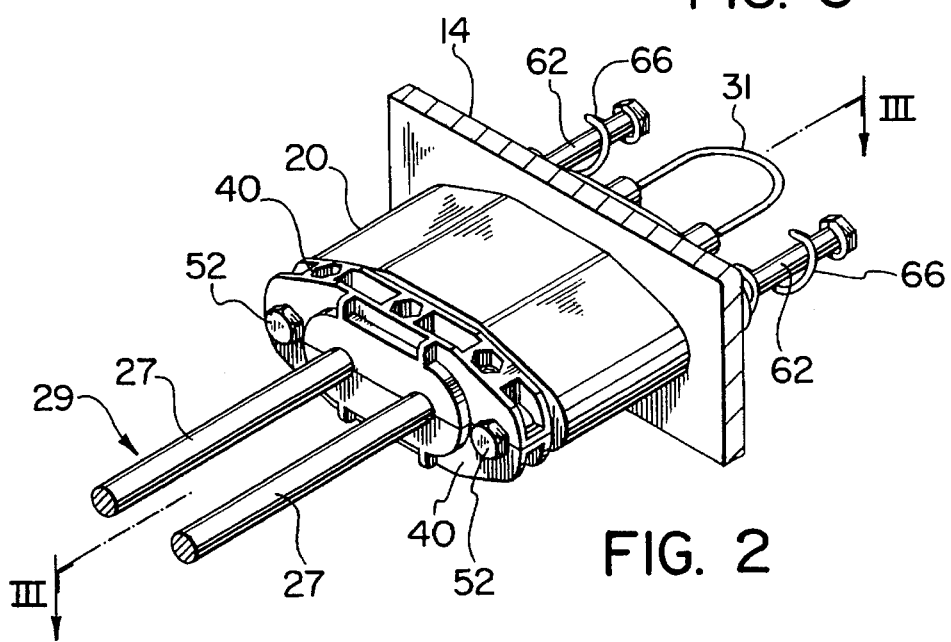
FIG. 2 is an isometric view, on a much larger scale than FIG. 1, of the detail of the first embodiment.
Figure 4:
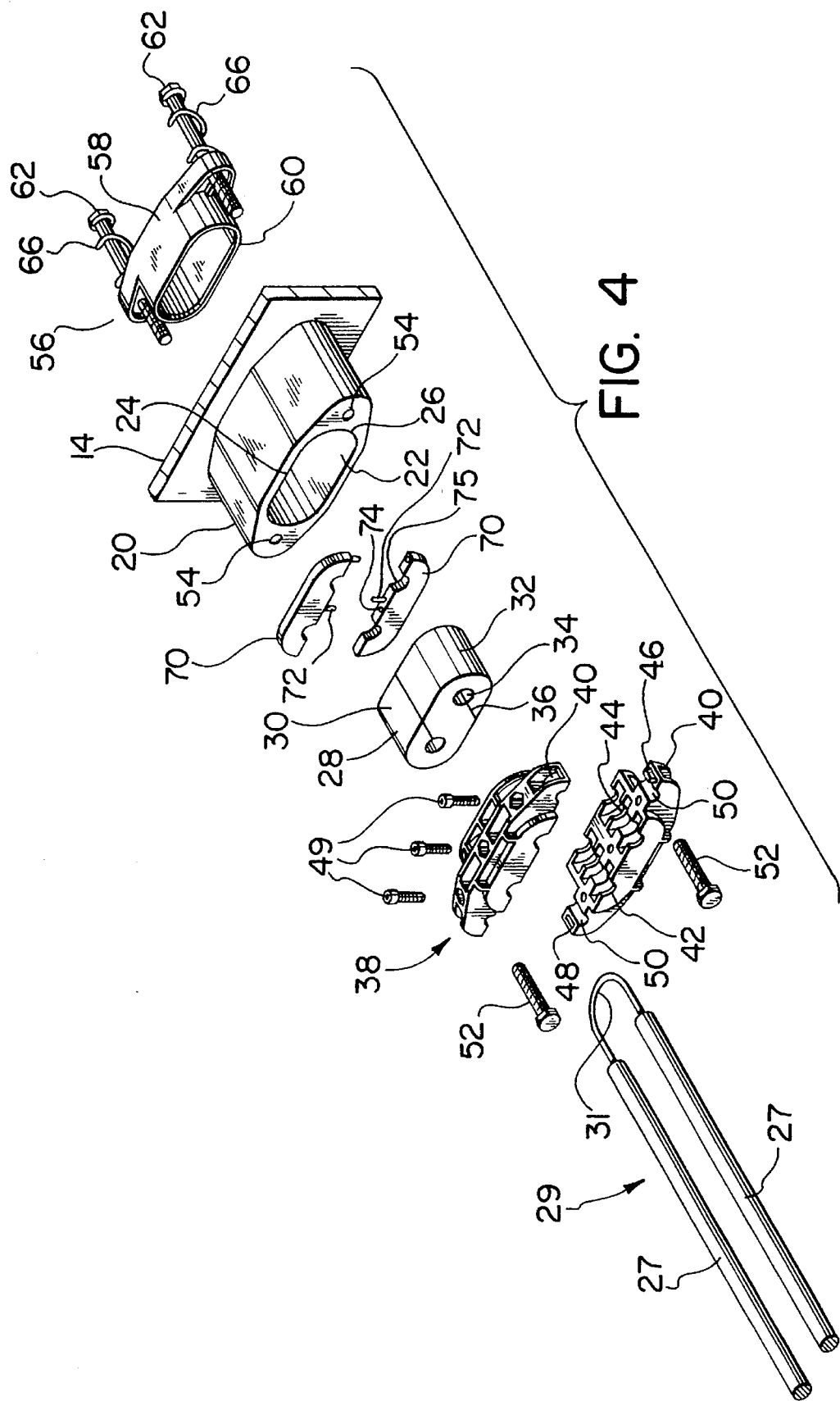
FIG. 4 is an exploded isometric view to a smaller scale than FIG. 2 and in the same direction as FIG. 2.

The structure 10 has as part of its end wall 14 or sealingly secured thereto, a housing 20 as shown in greater detail in FIGS. 2, 3 and 4. Housing 20 has an outside shape which is generally of elliptical form with flat sides and rounded ends and projects outwardly from the wall 14 as shown. The housing 20 defines a through passage 22 (FIG. 4) which extends completely through the housing and through the end wall 14 into the interior of the enclosure. In the cross-section, as shown by FIG. 4, the passage 22 is laterally elongate in one direction, having two parallel flat spaced apart sides 24 with rounded ends 26.

Figure 5:
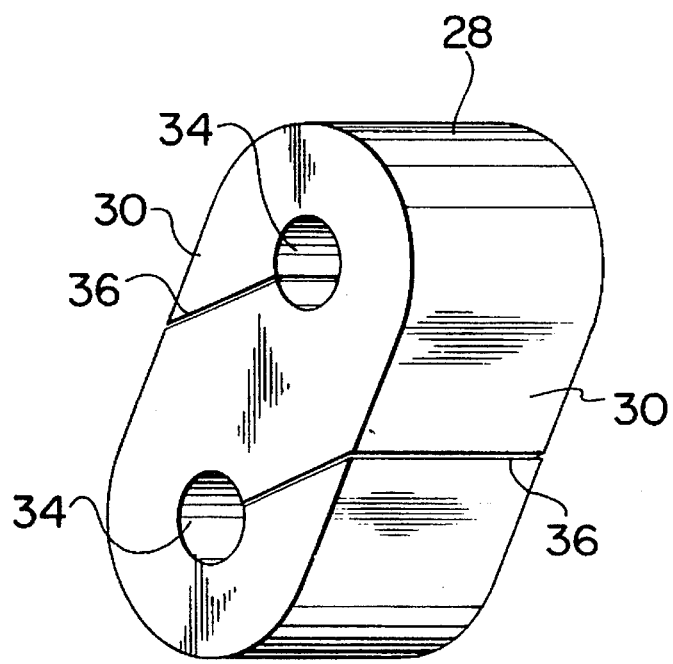
FIG. 5 is an isometric view of a sealing member of the enclosure of the first embodiment and to a large scale.
Figure 6:
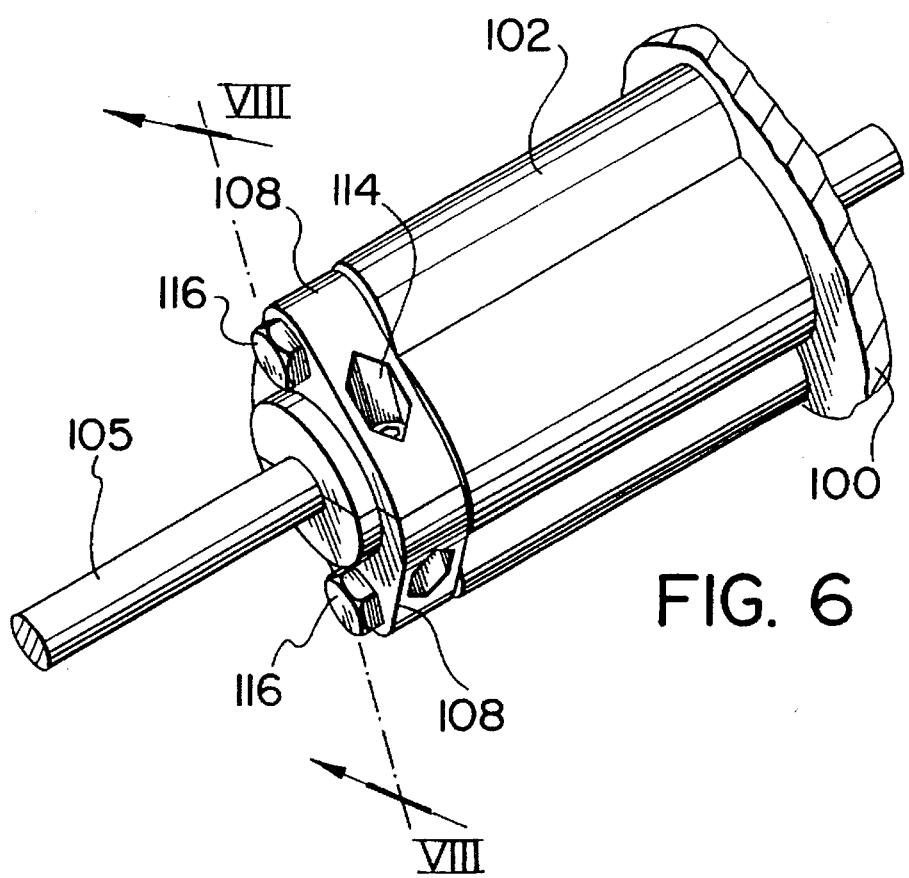
FIG. 6 is a view similar to FIG. 2 of part of the enclosure of a second embodiment similar to that of FIG. 2.

The inlet passage 22 is laterally elongate as described above for the purpose of sealingly accommodating two lengths 27 of cable which are to be disposed in spaced apart parallel relationship through the inlet passage into the interior of the enclosure, the two lengths forming part of the same indefinite length of the cable 29 which is passed into the enclosure and is looped as shown in FIGS. 2 and 3. Such cable may be stored in this way for future connection within the enclosure to other cables in which case the loop 31 is cut to expose conductors of both parts of the separated cable for individual connection to the other cables. A resiliently flexible sealing member 28 (FIGS. 3, 4 and 5) is provided for sealing the two lengths of cable within the inlet passage 22 to seal the inside of the enclosure from the outside. The sealing member 28 is formed from an elastomeric material which may be urethane. The sealing member is shaped complimentary to the surface of the inlet passage 22 and is of such a size in an unstressed condition upon insertion as to be slideably received within the passage 22. Because it is shaped complimentary to the inlet passage 22, the seal 28 has two planar and substantially parallel sides 30 which are joined at their ends by semicircular surfaces 32. Sealing member 28 is formed with two bores 34 which extend in parallel and spaced relationship through the sealing member, the bores being centered approximately on the centres of the semicircular ends 32. The bores are provided to surround the two lengths 27 of cable passing through the inlet passage so as to seal against the cable as will be described. As the cable is of indefinite length and has no end suitably positioned for passing through the bores 34, then to locate the cable lengths within the bores 34, two slits 36 are provided, one to each bore, from the outer peripheral surface of the sealing member. As shown in greater detail in FIG. 5, the two slits 36 are formed at an acute angle to the outer peripheral surface of the sealing member where the slits emerge onto the outer peripheral surface. Conveniently, in this embodiment, the slits emerge one at each of the parallel sides 30. As may be seen, from the position and direction of the two slits, the material of the sealing member forming one side of each slit lies outwardly of the sealing member from material on the other side of the slit and directly opposing it. Hence if a compressive force is applied against the planar surfaces 30 of the sealing member, then the material on the outer side of the slit is compressed against the material on the other side of the slit so as to close the slit and seal it against ingress moisture.

At the outer end of the housing 20 is provided a means for gripping the cable so as to hold the cable passing through the inlet passage 22 immovable relative to the housing 20. The gripping means comprises a clamping device 38 which is provided by two clamping parts 40 which may be disposed one on each side of the two cable lengths 27 as they pass into the inlet passage 22. Each clamping part is provided with two semicylindrical bore portions 42 each provided with axially spaced semicircular cable gripping surfaces 44. For aligning the two clamping parts 40 with the bore portions 42 forming two circular bores, alignment means is provided in the form of a registration projection 46 at one end of each clamping part 40 which is engagable with a complimentary recess 48 at the other end of the other clamping part 40. The clamping parts 40 may be assembled together by the use of three bolts 49 (FIG. 4) which pass laterally of the bores through the clamping parts.

The clamping device is locatable in an operating position axially beyond one end of the passage of the sealing member by being secured to the outer end of the housing 20. For this purpose, the assembled clamping parts provide two remotely positioned bores 50 which receive securing bolts 52 which pass through the bores and into screw threaded blind bores 54 provided in the housing 20 in positions upon the major axis of the inlet passage 22 and outwardly beyond the ends 26 of the passage. This is shown in FIGS. 2, 3 and 4.

At the other end of the housing 20, there is provided a means for applying a constant compressive force in an axial direction of the inlet passage upon the sealing member. This is to cause the sealing member to be resiliently deformed radially inwardly of the inlet passage and into sealing contact with the cable lengths in the inlet passage 22. As shown particularly by FIGS. 3 and 4, the means 56 for providing the compressive force comprises a rigid plate structure 58 of similar elongate shape to the housing 20, the plate 58 having an integral endless flange 60 extending from one side of it, the flange 60 also being of elongate nature in end view for sliding reception within the inlet passage 22. The plate 58 and its integral flange 60 is resiliently mountable upon the inside of the enclosure by being received upon two parallel pins, provided by bolts 62, which are screw-threadably received within bores 64 (see FIG. 3) extending inwardly into the housing 20 in alignment with the bores 54. Between the heads of the bolts 62 and the one side of the plate 58 are provided two compression springs 66 which urge the plate 58 away from the heads along the pins. Thus with the plate assembled within the enclosure, as shown in FIG. 3, the flange 60 is slidably received within the inlet passage 22 and is urged along the passage by the springs 66.

Disposable within the inlet passage 22 are two planar plates 70 which may be assembled together with the use of registration pins 72 and corresponding bores 74, the plates 70 when being assembled being slidably receivable within the inlet passage 22. The plates in their assembled condition are intended for engagement over substantially the whole of the one end surface of the sealing member 28 and also to abut against the free end of the flange 60.

In order to assemble the cable into the enclosure through the inlet passage 22 and to seal this into position, the following procedure is followed.

The cable 29 is first looped as shown in FIG. 4 and, if required, the cable jacket may be removed as is also shown. The sealing member 28 is then disposed in an appropriate location spaced a desired distance away from the end of the loop, with the cable lengths 27 passing through the two bores 34. For this purpose, the sealing member 28 is deformed so as to open the two slits 36 to enable lateral entry of the cable into each of the bores 34. The plates 70 are then assembled together, one on each side of the cable lengths, so that lengths pass through bores formed by combined semi-cylindrical recesses 75 in the plates and with the plates disposed on the side of the sealing member which is closer to the loop of the cable. With the plate 58 screwed into position on the inside of the enclosure, i.e., with the screws 62 received within the screw threaded bores 64 and with the end of the flange 60 projecting into the aperture 22, the assembly of the cable plate 70 and sealing member 28 is passed into the aperture 22 on the outside of the enclosure. The loop 31 of the cable is thus passed through the orifice in the flange 60 in plate 58 until it is located a desirable distance=within the enclosure sufficiently for it to be opened subsequently for it to be connected to terminals or other cable lengths as required. With the plate 70 and sealing member 28 slidably received within the aperture 22 and with the plate 70 engaged with the free end of the flange 60 as shown in FIG. 3, the clamping parts 40 are located in their desired positions on the outside of the enclosure. To assemble the clamping parts, they are disposed one on each side of the two lengths 27 of cable projecting from the aperture 22 and are aligned by reception of the registration projections 46 within the registration recesses 48. With the clamping parts 40 held together by the holding screws, the two lengths 27 of cable are gripped tightly between the semicircular gripping surfaces 44 of the two clamping parts. The clamping parts are disposed abutting the end surface of the housing 20 and the holding screws 52 pass through the bores 50 in the clamping parts to secure the clamping device onto the end surface by reception of the screws within the screw threaded holes 54.

In the initial assembled condition, the clamping device is held tightly against the outer end surface of the housing 20 and the plate 58 is loosely held on the opposite side of the end 14 of the enclosure. In this condition, the sealing member 28 is rather loosely contained within the aperture 22. The sealing member is compressed axially so as to seal itself around each of the lengths of cable by tightening the screws 62 into their respective screw threaded bores 64 in the end plate 14 so that the compression springs 66 apply an increasing end load upon the plate 58. This forces the flange 60 inwardly into the aperture 22 as shown in FIG. 3, thereby forcing the assembled plates 70 along the aperture to compress the sealing member 28 against the clamping device. As the pressure is increased, the sealing member 28 is deformed initially both radially outwardly and inwardly until the outer surface of the sealing device 28 engages and is urged tightly against the inner surface of the inlet passage 22. As the screws 62 continue to be tightened in their respective bores, the compression on the sealing member continues and this effectively causes continued radially inward movement of the sealing member so that the material of the sealing member forming the bores 34 is compressed tightly against the outer surface of the lengths of cable which it surrounds. This effectively seals the sealing member against the cable lengths 27 to prevent ingress of material into the enclosure.

It will be appreciated that the assembly and the sealing of the cable into the end wall 14 is a simple operation and this operation is not arduous nor time consuming. Also, the seal provided between the sealing member 28 and the cable is particularly effective for its service requirement. In particular, the springs 66 provide a means for applying a constant compressive force in an axial direction upon the sealing member. The springs 66 are held continuously in position by the heads of bolts 62 so as to apply a continuous axial load against the sealing member 28, and any change in ambient conditions, such as temperature change, will not affect the seal because of swelling or shrinking of materials, because the springs ensure that sufficient radial deformation of the seal takes place to hold it constantly in sealing engagement with the cable.

Hence the enclosure of the first embodiment provides an efficient seal which is easily assembled in situ, i.e., within a manhole, and it ensures that constant sealing operation results without fear of leakage.

In addition to this, as shown by the embodiment, the clamping device prevents any axial movement of the cable through the inlet passage 22. The clamping device in being actually secured directly to the housing 20 prevents movement of the lengths 27 of the cable passing through the sealing member 28 by preventing any tendency for the cable to be forced in either axial direction through the aperture. This thereby prevents ay undue strain being placed upon the sealing member 28 which could undesirably deform the sealing member and/or break the seal with the cable.

Figure 7:
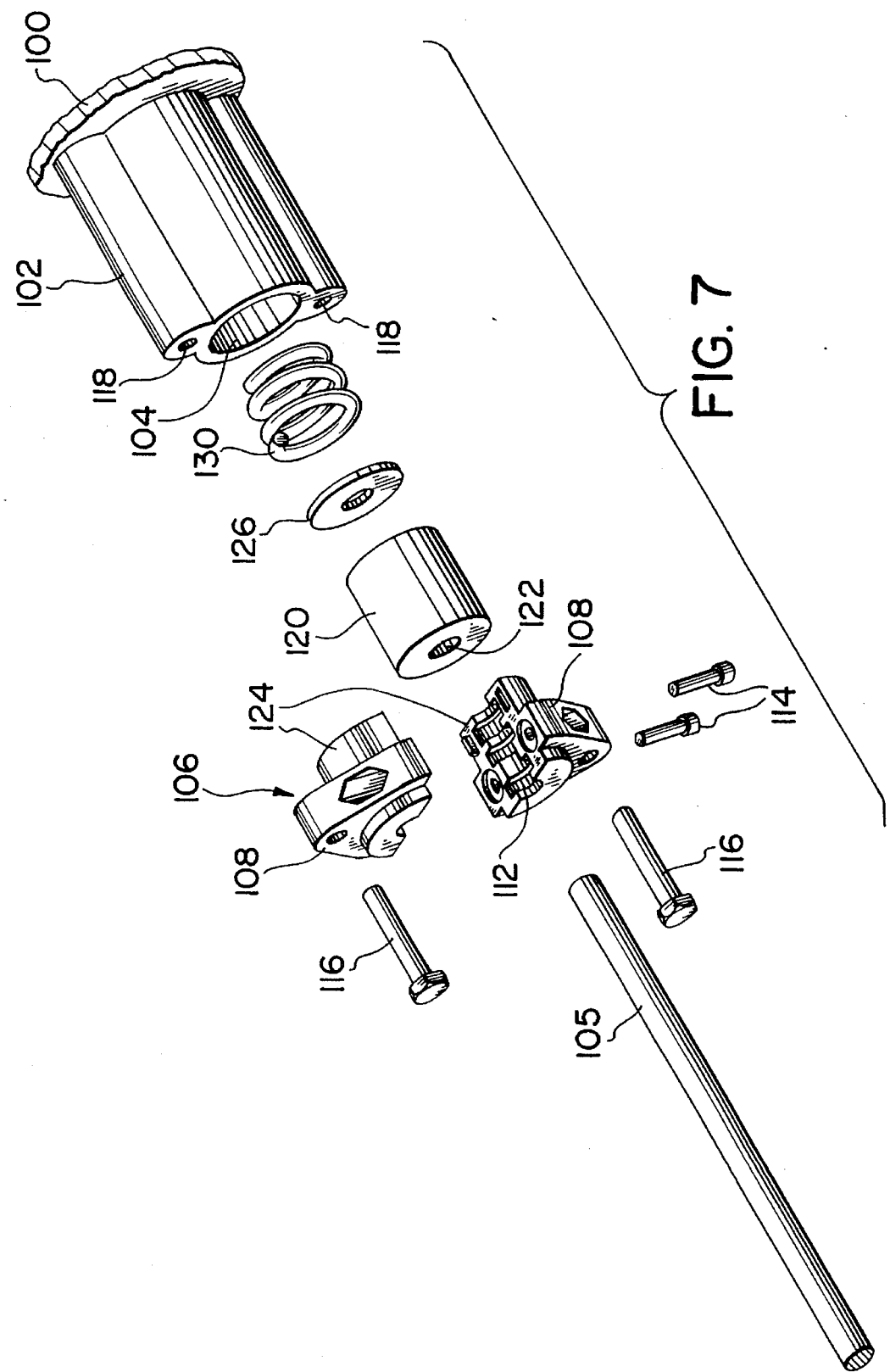
FIG. 7 is an exploded isometric view of part of the enclosure of the second embodiment.

In a second embodiment of a transmission cable enclosure, the enclosure has an end wall 100 which carries a housing 102 formed with a circular inlet passage 104 for the purpose of accommodating a single cable length 105 to be entered into the enclosure. As shown particularly by FIG. 7, a clamping means is provided in the form of a clamping device 106 formed by two clamping parts 108 of similar shape to one another, the clamping parts to be positioned one on each side of the cable length 105 to be passed through the aperture 104 and into the inside of the enclosure. The two clamping parts have semicylindrical recesses 112 which, when the clamping parts are assembled together on each side of the cable, engage completely around the cable. Holding screws 114 are used for passing between the cable parts 108 for the purpose of clamping them tightly around the cable length. In addition, securing means is provided for securing the clamping device to the housing and this securing means comprises two securing bolts 116 which pass through the assembled clamping device for reception in screw threaded holes 118 formed into the free end surface of the housing 102. This is similar to the mounting arrangement for the clamping device in the first embodiment and is shown in assembled condition in FIGS. 7 and 9.

Figure 8:
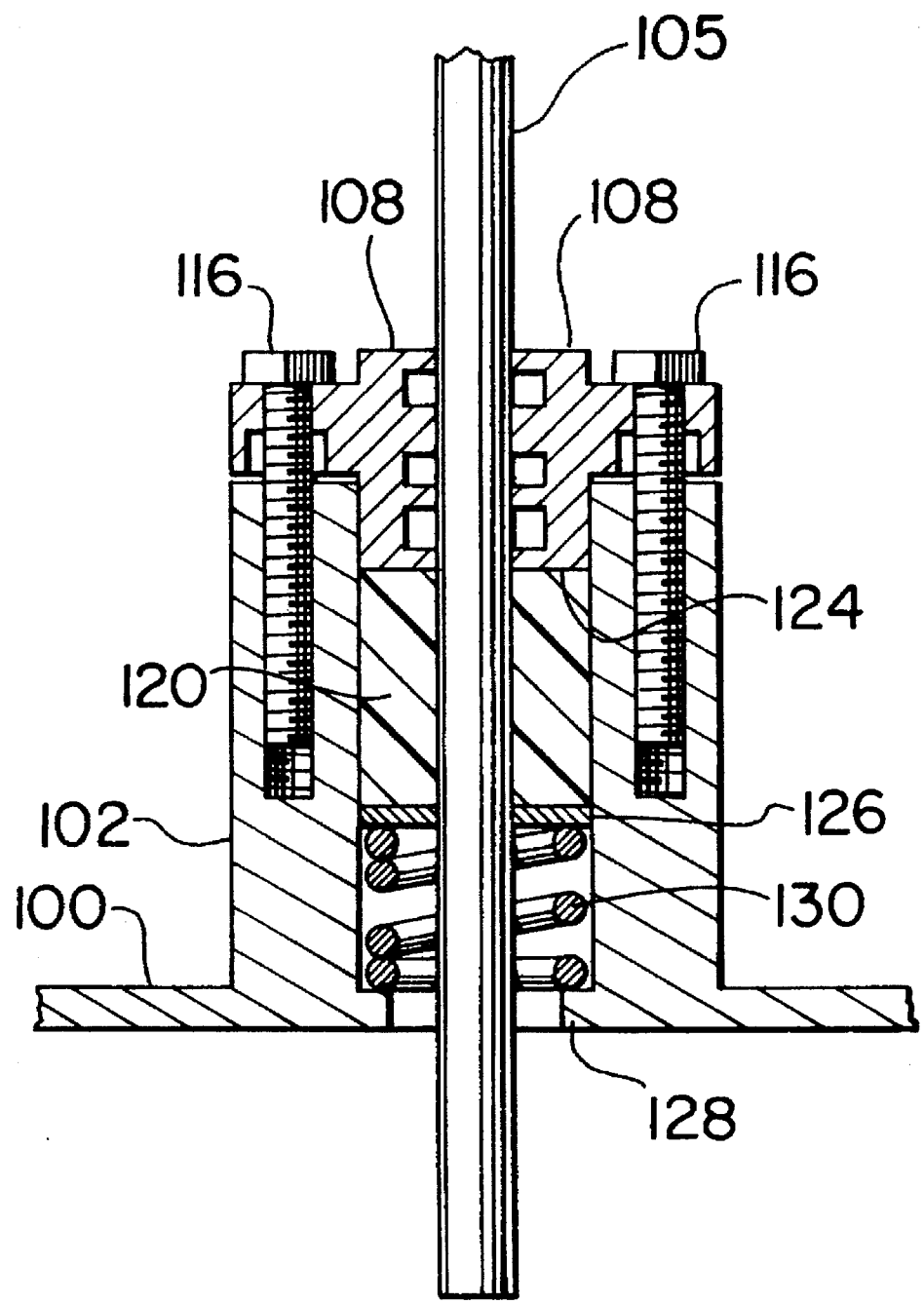
FIG. 8 is a cross-sectional view through the part of the second embodiment taken along Line VIII—VIII in FIG. 6 and to a smaller scale.

Basically, as may be seen from the above, the structure of the second embodiment is similar to that of the first embodiment in a variety of ways. The structure of the second embodiment differs from the first embodiment, however, in the formation of its sealing member and of the means for providing a constant compressive force to force the sealing member into constant sealing relationship with the outside surface of the cable. As may be seen particularly from FIG. 8, the sealing member 120 of the second embodiment is formed of a resiliently deformable elastomeric which may be of the same material as the first embodiment, but in this case the sealing member is formed as a cylinder with a concentric bore 122 without any radial slit extending to the periphery. Because the cable length 105 has an end which will be within the enclosure in the second embodiment, it is a simple operation to slide the unstrained sealing member 120 onto the free end of the cable length and to the position in which it is required to seal against the cable length. The sealing member is intended to abut against an inner end 124 of the assembled clamping device and at its other end is intended to abut against a metal washer 126 which is also provided to surround the cable length. Between the metal washer 126 and a radially inner flange 128 (FIG. 8), at the inner end of the aperture 104, is contained a compression spring 130. This is to provide the constant compressive force in the axial direction on the sealing member.

To assemble the parts into position, the sealing member 120 is disposed along the length 105 of cable into a position such that with the sealing within the inlet passage 104, sufficient of the length 105 of the cable extends into the enclosure for connection purposes to terminals or to another cable also extending into the enclosure. The washer 126 and the compression spring 130 are next disposed upon the cable length 105 and the cable length with the assembled parts upon it, is then inserted through the inlet passage 104 so as to extend a sufficient distance on the other side of the end plate 100. In this condition, the spring 130, washer 126, and sealing member 120 are disposed within the aperture 104. The clamping device 106 is then disposed around the cable length with the end 124 of the device extending into the outer end of the aperture 104 (see FIG. 8). With the clamping device assembled together with the screws 114, the screws 116 are passed through the respective bores in the clamping device to be received into the screw threaded bores 118. The clamping device is then tightened into position and this effects slight axial movement of the cable further into the aperture 104 because the clamping device is also moving inwardly upon the housing 102. As this clamping device is tightened, it places an end load upon the sealing member 120 which at its opposite end commences to compress the spring 130. As the screws are continued to be tightened, the compressive force increases so as to radially expand the sealing member 120, thereby sealing it against the inner surface of the aperture 104 and against the cable similar to the manner described in the first embodiment. Thus in use, the spring 130 places a constant compressive force against the sealing member to provide the constant sealing advantages which are described with regard to the first embodiment. Also, as described in the first embodiment, the clamping device in being screwed directly onto the housing 102 ensures that the cable cannot move axially within the aperture nor within the sealing member 120.

What is claimed is:

1. A transmission cable enclosure comprising a housing in a wall of the enclosure, the housing formed with an inlet passage having two ends for insertion of a cable through the wall of the enclosure;

a resiliently flexible sealing member for location within the inlet passage of the housing in a position for surrounding the cable the sealing member being restrained from radially outwards deformation;

means for applying a constant compressive force in an axial direction of the inlet passage upon the sealing member to cause the sealing member to be resiliently deformed radially inwardly of the inlet passage and into sealing contact with the cable;

and means for gripping a part of the cable in a position axially spaced from the sealing member to hold the gripped part of the cable immovable relative to the housing;

the gripping means comprising a clamping device locatable in an operating position axially beyond one end of the inlet passage and of the sealing member and a securing means operable to hold the clamping device in its operating position.

2. An enclosure according to claim 1 wherein the sealing member is disposed axially between the clamping device and the means for applying the constant compressive force whereby the means for applying the constant compressive force is operable to compress the sealing member against the clamping device.

3. An enclosure according to claim 2 wherein the clamping device comprises at least two gripping members relatively disposable in operative positions to grip the cable between them when located through the sealing member in the inlet passage, and holding means to hold the gripping members in the operative positions, and the securing means is operable to secure the gripping members, when in the operative positions, to the housing at said one end of the inlet passage.

4. An enclosure according to claim 3 wherein the means for applying the constant compressive force comprises an apertured member locatable at the other end of the inlet passage, and means for resiliently mounting the apertured member at the other end of the inlet passage to urge the apertured member axially so as to compress the sealing member against the clamping device.

5. An enclosure according to claim 4 wherein the resilient mounting means comprises a plurality of pins extending from the housing, the apertured member slidable upon the pins, and compression springs mounted upon the pins to urge the apertured member along the pins to compress the sealing member against the clamping device.

* * * * *